Oct. 19, 1948.  H. R. MOORE  2,451,572
RADIANT ENERGY MEASURING APPARATUS
Filed Dec. 27, 1945  3 Sheets-Sheet 1

INVENTOR
H. R. MOORE
BY
Ch Sprague
ATTORNEY

Oct. 19, 1948.  H. R. MOORE  2,451,572
RADIANT ENERGY MEASURING APPARATUS
Filed Dec. 27, 1945  3 Sheets-Sheet 2

INVENTOR
H.R. MOORE
BY
ATTORNEY

Patented Oct. 19, 1948

2,451,572

UNITED STATES PATENT OFFICE 2,451,572

RADIANT ENERGY MEASURING APPARATUS

Hilbert R. Moore, Pluckemin, N. J., assignor to Bell Telephone Laboratories, Incorporated, New York, N. Y., a corporation of New York Application December 27, 1945, Serial No. 637,412

6 Claims. (Cl. 250—41.5)

This invention relates to apparatus for measuring or recording the intensity of a beam of radiant energy or for detecting and indicating or utilizing changes in intensity of a radiant energy beam. More particularly it relates to infra-red spectrometers.

Infra-red spectrometers are commonly employed to identify the constituents of liquid or gas and to determine the amounts present. This is done by ascertaining the frequencies of wave-lengths at which absorption occurs and the amount of the absorption. The source of light may be a Nernst glower. Each frequency component dispersed by the prism is examined by a detecting device—a bolometer for example. The beam of radiant energy from the glower may be periodically interrupted by a "chopper," a segmented rotary disc, for example, before it enters the container of the sample of the material to be tested, whereby there is set up a pulsating current in the bolometer circuit, the bolometer being in series with a source of direct potential. These signal variations are then amplified and rectified and used to control a recording instrument. The record shows the transmission and absorption bands of the sample being investigated. The wave-length range of the heat beam may, for example, be from 2 to 18 microns. From 10 to 40 minutes may be required to make a spectrographic record, depending upon the required fidelity of indication of the height of the peaks and depths of the troughs of the record. Any increase in the speed of operation which can be effected is highly important in industrial use of these instruments.

Increasing the speed has been found a difficult problem. The energy of the beam incident upon the bolometer is very small—of the order of $10^{-6}$ watt or less in a typical case. This is of the order of the energy of inescapable interfering effects due to thermal agitation in the bolometer and amplifier noise, effects which occupy a wide frequency band. Interference from outside sources, such as mechanical vibration and inductive effects, may be wholly or largely eliminated by well-known means such as mechanical cushioning and electrical shielding, but the eliminating of the amplifier noise and thermal agitation effects must be effected within the apparatus on a basis of frequency selection, as well as low frequency interference effects which arise within the apparatus, such as ambient temperature changes which slowly change the bolometer temperature or a change from the normal maximum amplitude of the radiant beam to a somewhat higher value, as sometimes happens, which results in a slow average rise in temperature of the bolometer. Heretofore, the amplifier, which must have five or six stages to produce sufficient amplification, has been provided with rather sharply tuned circuits selective of the signal frequency generated in the bolometer circuit in order properly to select this frequency and discriminate against noise components. The frequency must be sufficiently low to permit the bolometer to respond properly. (This instrument is somewhat sluggish in its response compared with a photoelectric cell.) But it is found that if the chopping frequency is too low, noise interference becomes more difficult to eliminate. Fifteen to twenty cycles per second has been found to be a suitable compromise value. The resonant current in a circuit sharply tuned to this relatively low frequency builds up rather slowly.

This invention is the result of studies and experimentation to determine the factors limiting the speed of operation of an infra-red spectrometer arrangement of the kind described above (more particularly one using a bolometer of the thermistor type as the radiant-beam sensitive element) and to devising means to improve the speed of operation without sacrificing fidelity of response. In accordance with the invention no sharply resonant circuits are used, selectivity of the signal being accomplished by employing in the output circuit a full wave rectifier which is caused to act in synchronism and phase with the amplified signal applied to it, the resultant current being passed to an indicating or recording instrumentality which has the property of responding appreciably only to direct or very low frequency current, and by providing means (ordinarily in the input circuit of the amplifier or partly there and partly within the amplifier circuits) to eliminate the effect of low frequency interfering components. The desired characteristic of the indicating or recording instrumentality may be due to inertia of the indicating or recording instrument per se or to associated electrical elements having the property of a low-pass filter or in part to both. It has been found that this arrangement discriminates to a very large extent against noise and does not have the above-mentioned disadvantages of sharply resonant circuits, i. e., the long build-up period for the necessarily low frequency of the selected wave. Thus the speed of operation is increased. The amplifier preferably has a relatively flat gain-frequency characteristic over a range extending up to about the fifth harmonic of the frequency of interruption of the radiant energy beam and down to about one-half of that frequency, cut-off at the extremities of this range being obtained in any well-known manner, as by choice of amplifier coupling elements (capacity and resistance), so that overloading of the output stage of the amplifier is avoided. Also the amplifier should be of a type having a high degree of gain stability with time, as may be achieved by the use of inverse feedback. Troublesome phase shifts may occur in an amplifier in which rather sharp tuning is obtained by inverse feedback used to obtain the selectivity of the signal frequency and insure a high degree of gain stability. The present invention avoids this. The full wave rectifying action when components of low frequency are applied to the rectifier results in the production of alternating components which cause the recorder to respond. Low frequency disturbances may also overload the amplifier and thus introduce components which affect the recorder. To overcome this limitation on the ability of the full wave rectifier-recorder combination to discriminate against all interfering frequency components, means are provided in the input circuit of the amplifier, or preferably, partly in the input circuit and partly beyond that point, to effectively suppress the very low interfering frequencies generated in the input circuit. The gain-frequency characteristic of the amplifier preferably has a rather sharp lower cut-off which causes any of these low frequencies which reach the amplifier to be discriminated against. An out-of-phase interference of the same frequency as the signal is wholly or partly discriminated against by the full wave rectifier-indicator combination on a phase discrimination basis, as will be explained below. Interference from this single frequency is, of course, not likely to be of importance.

In the arrangement now preferred, the full wave rectifying action is produced by a rotating brush commutator on the same shaft as the beam interrupter, the angular position of the brush with respect to the shaft being preferably adjustable during rotation of the shaft to accurately adjust the phase relation—i. e., to cause the commutating action to take place at the exact times when the amplified alternating signal component is reversing in polarity. The resulting pulsating direct voltage is applied to a direct current measuring or recording element having the effect of a low-pass filter whereby the alternating components resulting from impressing noise components on the commutating element are very largely suppressed. For example, an Esterline-Angus five-milliampere recording meter requires approximately 1.7 seconds for attainment of 98 per cent of an ultimate full scale deflection. It will not therefore respond appreciably to an alternating component unless the frequency of that component is relatively very low. If it is desired to use a recording device which does not have this property, such as a cathode beam recording instrument, the suppression of these unwanted components may be effected by means of a suitable low-pass filtering element. The time required for obtaining substantially full scale deflection is preferably not more than two seconds nor less than one second.

Electrical rather than mechanical commutation may, of course, be employed, such for example as a bridge type of full wave rectifier in which the rectifying action takes place under control of pulses generated by pulse generating means coupled to the chopper shaft or the driving means therefor. The direct-coupled mechanical commutating arrangement described above is, however, less complicated and costly. It is more direct and positive in its action. It avoids the necessity for pulse generation and the difficulties which may arise in electrical pulse operation, especially if the speed of the chopper varies somewhat from time to time.

The principles employed may obviously be used in arrangements which have uses other than in the art of spectroscopy. The scope of the invention in its various aspects will be apparent from the claims hereto appended.

An embodiment of the invention is described more in detail below, to serve as an illustration of the principle employed, reference being made to the accompanying drawing in which.

Figure 1:
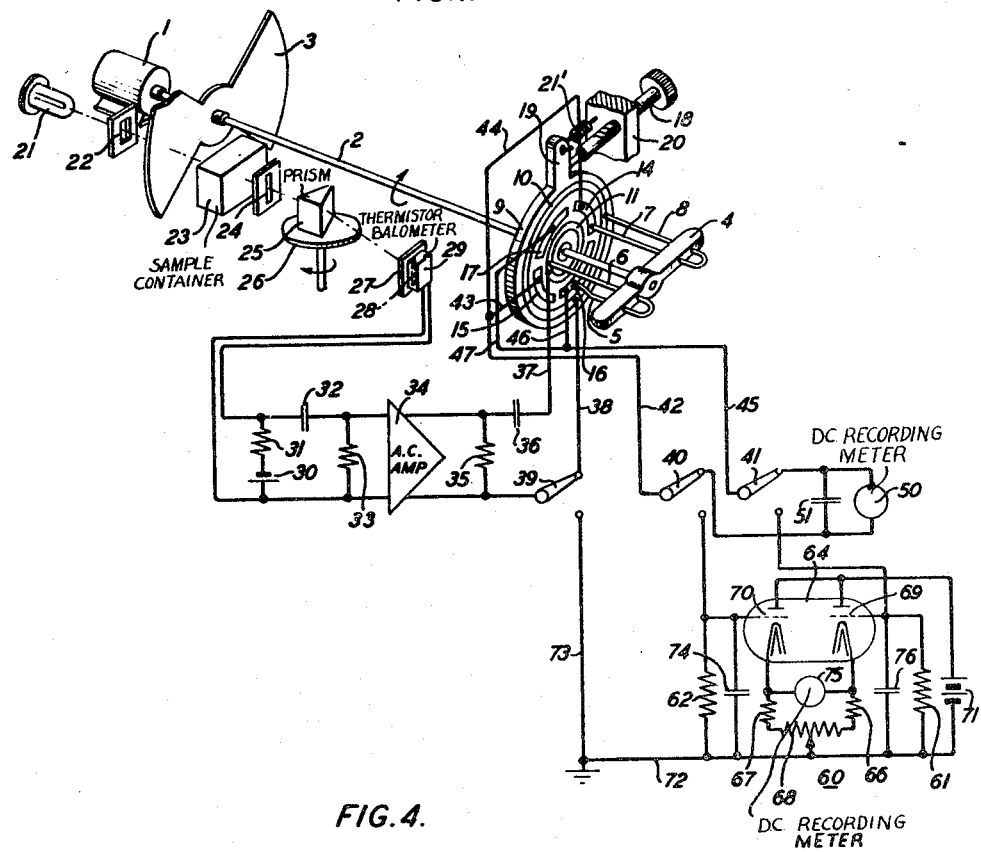
Fig. 1 is a diagrammatic showing of the various elements used and their association.

Referring to Fig. 1, motor 1 drives shaft 2 to which is rigidly attached the light-chopping disk 3 and brush arm 4 carrying brushes 5, 6, 7 and 8. Disk 9 has a central bearing in which shaft 2 rotates. It has two conducting rings 10 and 11, which are respectively in continuous contact with brushes 8 and 6, and a segmented ring having four equal segments 14, 15, 16 and 17. Each of brushes 5 and 7 contacts these segments in turn so that at all times two adjacent segments are respectively in contact with these brushes. Disk 9 is fixed in position by any suitable adjustable means such as adjusting screw 18 bearing on lug 19 which is held against the screw tip by spring 21 attached to support 20.

Rays from a source 21' of light, or heat, waves, which may be a Nernst glower, pass through a small aperture 22 in a baffle or casing and from there through the openings between the chopper blades and to the sample container 23. The latter, for simplicity of illustration, is here shown merely as a box-like structure. The container is provided with windows or walls transparent to infra-red radiation. The emergent beam impinges upon the entrance slit 24 of the spectrometer. The latter comprises the usual entrance and exit slits 24, 28 with a prism 25 mounted therebetween so that the exit slit lies in the refracted beam. The prism is of material which is transparent to infra-red rays, such as rock salt, and is mounted upon a rotatable support 26 which may be rotated through a small angle by any suitable means, such as a motor driving a worm gear, to bring one after another of the vertical elemental portions of the dispersed beam into alignment with the exit slit 28. Closely adjacent the exit slit is the detecting element 29 which may be any of the elements heretofore used in commercial infra-red spectrographic apparatus but is preferably of the thermistor-bolometer type described and claimed in United States Patent 2,414,792, issued January 28, 1947, to J. A. Becker.

Thermistors may be constructed in any suitable manner, for example, that disclosed in United States Patent 2,414,793, issued January 28, 1947, to J. A. Becker and H. Christensen. The so-called thermistor-bolometer comprises a small flake of material the resistance of which is of the order of several thousand ohms and changes rapidly when radiant heat is applied thereto. This flake has electrical leads connected to its extremities and has its back surface in intimate contact with a so-called thermal sink. For example, the flake may be 0.2 millimeter wide, 3.0 millimeters long and about 15 microns thick. A suitable material is an oxide of maganese, nickel or cobalt or a material comprising the combined oxides of these chemical elements. The resistance of this element falls rapidly as the temperature is increased. The backing element may be a relatively large slab of crystalline sodium chloride of such size and shape as to give the optimum time constant for the combined flake and backing element. Generally speaking, it is desired to have the time constant relatively short. The flake is of such size and shape as just to be covered by the beam emerging from the exit slit. Its small size results in rapid heating. The backing element causes rapid cooling of the flake without unduly affecting the heating rate. The thermal diffusivity of the backing element is large compared to that of the flake material. The thermal diffusivity may be defined as thermal conductivity divided by heat capacity per centimeter cube. To obtain a short time constant it is necessary to make the heat capacity small and have the dissipation constant large. This constant is the watts which must be applied to the thermistor to maintain its temperature 1° C. above its surroundings. Bolometer 29 is biased by a direct voltage source here shown as a battery 30. Resistance element 31 is in series with battery 30 and the bolometer and the potential variations appearing across the bolometer terminals are applied to the input of amplifier 34 through a circuit comprising series condenser 32 and shunt leakage resistance 33. This coupling wholly or very largely removes the slowly varying direct components of the voltage resulting from slow changes in the temperature of the surrounding air or undue rapid heating of the bolometer element from excessively large intensity of the incident beam, which may sometimes be present, which components would not be discriminated against by the full wave rectifier-indicator combination or which would overload the amplifier so as to set up frequency components which could not be discriminated against by that combination, as explained above. Furthermore, as also explained above, the gain-frequency characteristic of the amplifier is preferably so chosen that low frequencies which reach the amplifier are discriminated against, thus insuring substantially complete elimination of these frequencies if they are not previously eliminated.

Figure 2:
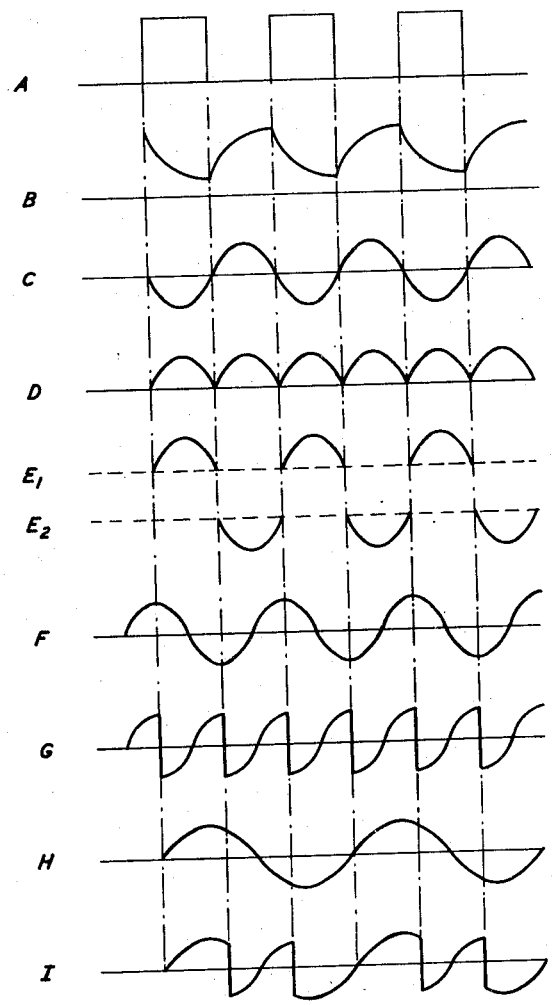
Fig. 2 is a series of graphs used to explain the principle of the invention.

The amplifier 34, which has the characteristics hereinbefore mentioned, has connected across its output terminals resistance 35, the terminals of which are connected respectively to rings 10 and 11 through condenser 36 and leads 37, 38 when switch 39 is in its uppermost position, at which time it is intended that switches 40 and 41 will likewise be in their uppermost positions. Condenser 36 blocks the flow of direct current. Lead 42 to switch 40 is divided to form leads 43 and 44 which are respectively connected to opposite segments 15, 14 of commutator disk 9 and lead 45 to switch 41 is divided to form leads 46, 47 connected respectively to opposite segments 16, 17. With the brush arm in the position shown, a circuit from the resistance 35 to the direct current ammeter or recorder 50 may be traced as follows: Condenser 36, lead 37, ring 11, brush 6, brush 5, segment 16, leads 46, 45, switch 41, ammeter or recorder 50, switch 40, leads 42, 44, segment 14, brush 7, brush 8, ring 10, lead 38, switch 39. When the brush arm 4 is moved to bring brush 5 in contact with segment 15 and brush 7 in contact with segment 17, the connection between leads 37 and 38 and leads 42 and 45 will be reversed, as will readily be understood and the original connection will be restored when brushes 5 and 7 pass on segments 17 and 16, respectively. The angular relationships of the chopper blades, brush arm 4 and commutator disk 9 are such that brushes 5 and 7 pass from segments with which they are in contact to the respective succeeding segments at the exact times when the alternating potential appearing across leads 37, 38 reverses in direction. This would produce a pulsating direct potential across element 50 the successive pulsations of which would occur at twice the frequency of the original alternating potential (see curves C and D, Fig. 2) if the low-pass filter effect of the element 50 with condenser 51 were absent. This effect results in the elimination of the signal frequency component, the direct component only being effective to operate the recorder or indicating needle.

An alternative arrangement for utilizing the commutated potential is indicated generally by reference character 60. Connection to it is made by throwing switches 39, 40, 41 to their lowermost positions. Lead 38, ring 10 and brushes 7 and 8 then become isolated and the current path from the terminals of resistance 35 to arrangement 60 may be traced as follows (when brush 5 is in the position shown): Condenser 36, lead 37, ring 11, brush 6, brush 5, segment 16, lead 46, lead 45, switch 41, resistance 61, lead 72 and lead 73. When brush 5 moves to segment 15, current from lead 37 flows to ring 11, brush 6, brush 5 and then over lead 42 to switch 40, resistance 62 and leads 72 and 73. The rotating brushes 5, 6, ring 11 and segments 14, 16, 15, 17 thus function as a distributor to transmit current flowing thereto (over lead 37) to leads 42 and 45 alternately in synchronism with the alternations of the impressed alternating voltage. In the absence of a signal the terminals of the milliammeter or recorder 75 are at the same potential, the movable contact on resistance 68 being adjusted until this condition obtains. When a pulse arrives over conductor 45, the potential of grid 69 is raised thereby (assuming that the commutator connections are such as to make this a positive pulse) and would then return to its original value were it not for the action of condenser 76 and resistance 61. These together have a long time constant and act as a low-pass filter. The succeeding pulse, which is negative, arrives over lead 42 and causes the potential of grid 70 to fall. Condenser 74 and resistance 62 act similarly to condenser 76 and resistance 61 to effect a low-pass filtering action. Corresponding changes of potential occur alternately at the two upper terminals, respectively, of resistances 66 and 67 (that is, terminals of element 75), the potential drop across element 75 always being in the same direction. The net result is that the current through the indicating or recording device is in the same direction for both halves of each wave of the signal voltage supplied from the amplifier output. The term full wave rectification as used herein is intended to apply to an action of this kind as well as to those in which both halves of each wave of impressed current are caused to flow through a device in the same direction, as, for example, the device 50 when switches 39, 40, and 41 are in their uppermost position.

Figure 4:
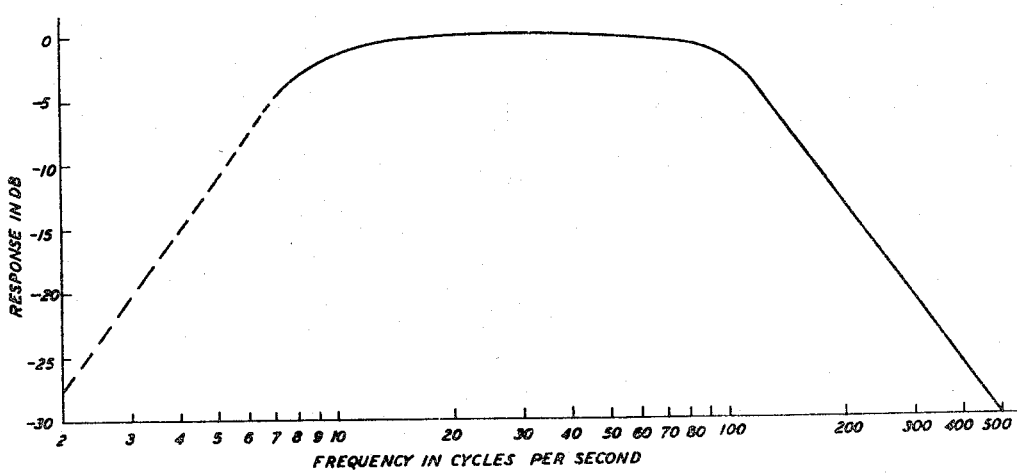
Fig. 4 shows the frequency response characteristic of the amplifier of Fig. 3.
Figure 3:
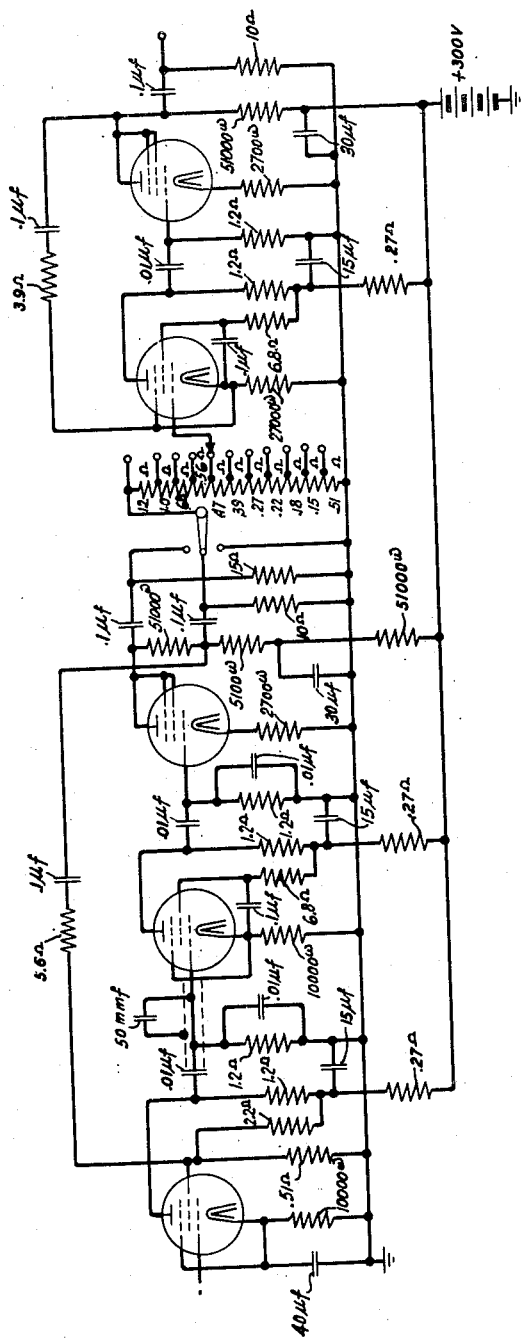
Fig. 3 shows a specific form of amplifying circuit arrangement which is suitable for use in the spectrographic equipment shown in Fig. 1.

Although various specific forms of amplifier circuits are suitable for use in the arrangement of Fig. 1 and one skilled in the art could readily design amplifier circuits having the preferred characteristics mentioned above, one form of amplifier having these characteristics is shown in Fig. 3 and its frequency response characteristic is shown in Fig. 4. Five stages of amplification are used with a potentiometer connection between the third and fourth stages for adjustment of the output level to place it within the range of the recording or indicating device. The tube in each of the first two stages is a Western Electric 348A tube, and that in each of the other stages is a Radio Corporation of America 6SJ7. The signal frequency applied to this amplifier may advantageously be around 20 cycles per second. The inverse feedback circuits provide a high degree of gain stability with time. From the curve of Fig. 4 it will be seen that the gain-frequency characteristic is relatively flat between ten and one hundred cycles and falls off rapidly above and below this range.

The operation of the system shown in Fig. 1 will be understood from the above description with the following explanation. The alternating signal, which has in it little, if any, interfering low frequency components, is applied to the amplifier. Adjusting screw 18 is adjusted until maximum signal response is obtained in the indicating or recording instrument. Full wave rectification will then be taking place in exact phase relation with the output voltage appearing across leads 37, 38. That this is so will appear from a consideration of the graphs of Fig. 2, which also indicate the action of the synchronized full wave rectification, which together with the action of the recording or indicating instrumentality, produce the limited selective action above described. Graph A represents the intensity variations of the radiant energy impinging on the bolometer. Assuming that the bolometer is one in which an increase of temperature decreases the resistance, a voltage like that shown in graph B will appear across the bolometer terminals and an alternating voltage which is roughly sinusoidal, as represented by graph C, will be impressed upon the amplifier. Graph D represents the voltage which would appear across the terminals of element 50, if the low-pass filter action of the combination of the device 50 with shunting condenser 51 were absent. It will be understood from the description at the beginning of this specification that the indicating or recording instrument has electrical inertia or that other elements are associated with it such that they or the instrument or the combined instrument and associated electrical elements have the character of a low-pass filter so that the deflection of the instrument is a linear function of the radiant energy in the absence of components which have relatively very low frequency. The individual pulses of graph D are not recorded or indicated. The same is true with respect to the recorder or indicator 75. Graphs E₁ and E₂ represent the voltage which would appear at grids 69 and 70 were these voltages not modified by condensers 74 and 76 with their associated resistances 62, 61. These condenser-resistance combinations have a relatively long time constant and act as low-pass filters. Graphs F and G show why full response of the indicating or recording instrumentalities to an interfering wave of signal frequency is not obtained if the commutating action is not in phase with the voltage reversals. As here shown, by way of example, commutation of the signal (graph F) takes place at the instants that the signal variations are of maximum amplitude. The resulting voltage would be, if condenser 51 for example were omitted, that shown in graph G. Since the average is zero in this case, the indicating instrument would at most respond but little. The low-pass filter action of condenser 51 and element 50 is effective to prevent any appreciable response. For lesser or greater phase differences the average is not zero and for zero phase difference the average is a maximum. Of course, little difficulty can arise from interference by any noise component at this single frequency.

Graphs H and I, respectively, exemplify an interfering component of frequency different from the signal and the voltage which would result from commutation in the absence of any. It will be noted that the average value of one or more complete cycles of the variations in graph I is zero. The direct current indicating instrumentality will therefore not respond to such components. It will be clear from a consideration of the graphs, however, that if the interfering wave has great length compared with that of a single pulse, the time constant of the indicating instrumentality will be too short to prevent response. Increasing the time constant would increase the time necessary to make a recording.

Thus it is seen that applicant has been able to effect a decrease in the time required to make a recording by eliminating sharply tuned circuits selective of the signal frequency (which slow down the speed of operation), substituting selectivity of the signal frequency by full wave rectification in synchronism with interruption of the radiant energy beam and application of the rectified voltage to an indicating instrumentality having a time constant sufficiently long to prevent appreciable response to the alternating components resulting from the frequencies in upper portions of the interfering frequency spectrum but not sufficiently long to prevent response to the lowermost portion of this spectrum, and utilizing other means which do not slow down the rate of recording for discriminating against interference in this low part of the interfering frequency band.

It will be obvious that the movement of the recording instrument may be utilized to perform some function other than indicating the energy present in the intermittent energy beam such as automatically controlling the proportions of constituents of a mixture to which the intermittent beam is applied.

What is claimed is:

1. A radiant-energy indicating system comprising means for periodically interrupting a beam of radiant-energy for equal periods of interruption separated by equal intervals of passage of the beam, radiant-energy sensitive means having output terminals connected therewith, said radiant-energy sensitive means being positioned in the path of the interrupted beam to respond thereto and produce direct current impulses, and having such a response characteristic as to generate along with said impulses unwanted disturbing electrical current variations occupying a wide frequency band including the frequency of the direct current impulses, an amplifier having an input circuit connected to said output terminals and an output circuit, said amplifier having a band-pass selective transmission characteristic extending from a frequency below that of said impulses to a frequency far above that of said impulses, said amplifier characteristic also discriminating very effectively against certain frequencies below said pass band, a synchronous full-wave rectifier having input terminals connected to the output circuit of said amplifier and output terminals, means for synchronizing said rectifier with the amplified impulses received from said amplifier, and an indicating instrument connected to the output terminals of said rectifier, said indicating instrument being responsive to unidirectional current and to the lower frequency components of the wide frequency band produced by said radiant-energy sensitive means, but substantially unresponsive to components of the frequency of said pulses.

2. The combination of claim 1 in which said amplifier has a gain frequency characteristic which is substantially flat for frequencies extending from about one-half to several times said impulse frequency and falls abruptly to a relatively low value at both extremities of said flat portion.

3. The combination of claim 1 in which the radiant-energy sensitive means is a bolometer of the thermistor type responsive to infra-red radiation and the periodicity of the interruption ranges from 10 to 30 times per second.

4. In a radiant energy control system, the combination of a chopper having means for periodically interrupting a beam of radiant energy to cause the duration of each passage of the beam to substantially equal that of each interruption, radiant energy sensitive means in position to respond to the intermittent beam to produce corresponding direct current signal variations each dependent in amplitude upon the intensity of the corresponding beam pulse, said sensitive means being of a type to generate along with said signal variations unwanted disturbing variations occupying a wide frequency band including said signal variations, amplifying means electrically connected to radiant-energy sensitive means for amplifying said signal variations along with said disturbing variations to produce corresponding alternating current components, synchronous full wave rectifying means connected to said amplifying means upon which the amplified alternating components are impressed, means for causing said rectifying means to act in synchronism with the impressing thereon of the successive half waves of said signal component, whereby only said signal component of said band of alternating components is rectified, an output circuit for said rectifier, and a direct current instrumentality connected to said rectifier output circuit which is substantially unresponsive to components within said alternating component band but which is responsive to certain frequencies below said band.

5. In apparatus for use in infra-red spectrographic analysis, the combination of a rotating chopper having means for periodically interrupting a beam of infra-red radiation to cause the duration of each passage of the beam to substantially equal that of each interruption, infra-red sensitive means in position to respond to the interrupted beam to produce corresponding direct current signal variations each dependent in amplitude upon the intensity of the corresponding beam pulse, said sensitive means comprising a metallic ribbon element of very small dimensions in effective thermal contact with an element of larger thermal diffusivity and having the characteristic that its electrical resistance changes sufficiently rapidly with changes in its temperature to produce said signal variations and at the same time generate unwanted disturbing variations of numerous different component frequencies extending over a wide frequency band including said signal variation frequency, amplifying means having an input circuit electrically connected to said infra-red sensitive means and an output circuit, means in said input circuit favoring transmission to the amplifier of components of said signal variation frequency and discriminating strongly against components of frequencies which are low as compared with the signal frequency, synchronous full-wave rectifying means having output terminals and input terminals which are connected to the output circuit of said amplifying means and upon which the amplified alternating component band of variations is impressed, said rectifying means comprising rotating and stationary conducting elements in sliding contact with each other, a shaft upon which said rotating chopper and said rotating elements are mounted, means enabling the angular positions of said rotating elements on said shaft to be set in a manner that rectification takes place in synchronism with the impressing on said rectifier of successive half-waves of said signal component to rectify only said signal component of said band of alternating components and to permit alternating components resulting from the passage of said disturbing components to pass through said rectifying means, an indicating instrument connected to the output terminals of said rectifier and responsive to unidirectional current, said instrument being substantially unresponsive to alternating components except those of very low frequency compared with said signal frequency.

6. In apparatus for use in infra-red spectrographic analysis, the combination of a rotating chopper having means for periodically interrupting a beam of infra-red radiation to cause the duration of each passage of the beam to substantially equal that of each interruption, infra-red sensitive means in position to respond to the interrupted beam to produce corresponding direct current signal variations each dependent in amplitude upon the intensity of the corresponding beam pulse, said sensitive means having the characteristic that its electrical resistance changes sufficiently rapidly with changes in its temperature to produce said signal variations and at the same time generate unwanted disturbing variations of numerous different frequencies extending over a wide frequency band including said signal variation frequency, amplifying means electrically connected to said infra-red sensitive means and including input and output circuits, full wave rectifying means connected to said amplifier output circuit, said rectifying means comprising rotating and stationary conducting elements in sliding contact with each other, a shaft upon which said chopper and said rotating elements are mounted, means enabling the angular position of said rotating elements on said shaft to be positioned in a manner that rectification takes place in synchronism with the impressing on said rectifier of successive half waves of said direct current signal variations, a direct current instrumentality connected to the rectifying means and which is substantially unresponsive to alternating components except those of very low frequency compared with said signal variation frequency, and frequency discriminating means in the input circuit of said amplifying means for preventing variations of sufficiently low frequency from appreciably affecting said direct current instrumentality from being impressed on said rectifying means.

HILBERT R. MOORE.

REFERENCES CITED

The following references are of record in the file of this patent:

UNITED STATES PATENTS

| Number | Name | Date |
|---|---|---|
| 1,926,824 | Stogoff | Sept. 12, 1933 |
| 1,948,941 | Olpin | Feb. 27, 1934 |
| 1,954,204 | Hayes | Apr. 10, 1934 |
| 2,166,124 | Breyer | July 18, 1939 |
| 2,237,193 | Mobsby | Apr. 1, 1941 |
| 2,314,800 | Pineo | Mar. 23, 1943 |
| 2,376,311 | Hood | May 15, 1945 |